Oct. 21, 1969    A. G. ALLEN    3,474,179

METAL MELTING OR SMELTING APPARATUS

Filed June 29, 1966

United States Patent Office 3,474,179
Patented Oct. 21, 1969

3,474,179
METAL MELTING OR SMELTING APPARATUS
Alec George Allen, Sutton Coldfield, England, assignor to Associated Electrical Industries Limited, London, England, a British company
Filed June 29, 1966, Ser. No. 561,464
Claims priority, application Great Britain, June 22, 1966, 27,967/66
Int. Cl. H05b 5/14
U.S. Cl. 13—29                4 Claims

ABSTRACT OF THE DISCLOSURE

A metal melting apparatus having a launder for transporting molten metal away from the main heating space of a furnace. The launder has a separate heating source including a U-shaped duct, wherein the legs of the U are in communication with the bottom of the launder. A heating coil is disposed between the legs of the U, and is magnetically coupled with the molten metal in the duct.

---

Figure 1:
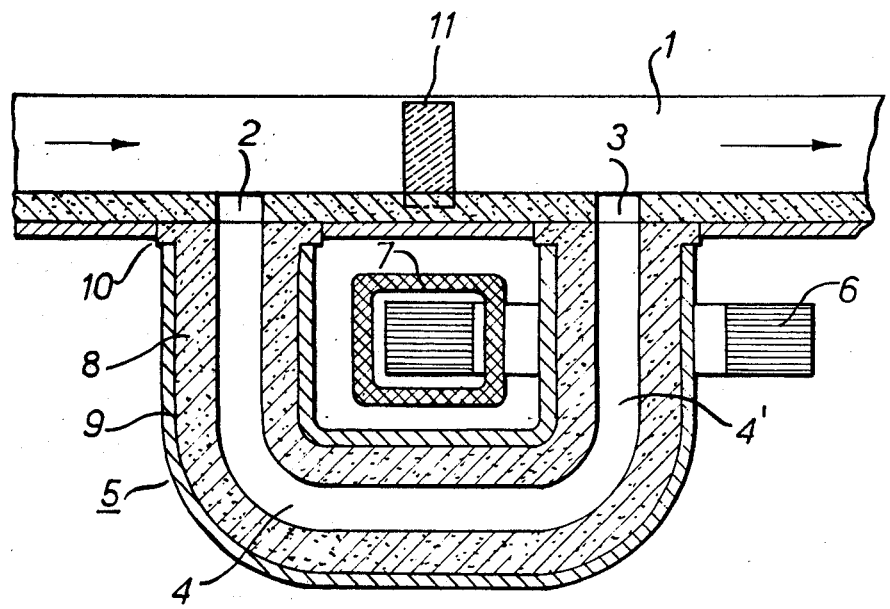

This invention aims at an effective and efficient, yet space saving and economical means of controlling the temperature of a discharge flow of molten metal, of the kind above described. This is achieved by including a portion of the said flow in an electrically conducting loop in which heating current is induced by a coil supplied with energy, a means diverting the molten metal from the channel to a duct which together with a channel portion forms a closed loop for induction by a primary winding, also contributing to the conductance of the loop.

Accordingly this invention resides in an apparatus for heating molten metal characterized by a channel having an inlet and an outlet for the molten metal, also having two ports therebetween, one of the ports being situated nearer the said inlet and the other situated nearer the said outlet, a duct interconnecting said ports and encircling with the channel portion between the said ports a free aperture, a coil supplied with energy, a magnetic core extending through said aperture and carrying the said coil, and a dam made of electrically conducting material, said dam considerably reducing the flow of molten metal through said channel between the said ports without reducing in the same proportion the electric conductivity in the channel portion between the said two ports.

The transfer of molten metal from a melting or smelting furnace along a trough or duct, commonly termed a launder, to a position of utilization such as a casting mould gives rise to the problem of compensating for loss of heat from the molten metal, and a consequent fall in its temperature, during the transfer. Various methods have been devised for effecting such compensation but the degree of success has been limited. One method is to raise the temperature of the molten metal in the furnace to a value higher than its utilization temperature by an amount commensurate with the fall in temperature to which it will be subject during its transfer. However, this method can lead to inefficient operation of the furnace or to unwanted inclusions in the molten metal. Another method is to incorporate in the launder a separate furnace, commonly known as a holding furnace or receiver, which is capable of increasing the temperature of the molten metal to the correct valve as dictated by the process to be carried out on the metal. This latter solution to the problem can be expensive and also inconvenient if the extra floor space required for accommodating the holding furnace is not readily available.

Yet another method which has been used is to raise the temperature of the molten metal in the launder by induction heating. This can be successfully achieved by the association of relatively compact induction heating apparatus with the launder, but hitherto the launder itself has had to be specially designed for this purpose. More specifically, the launder has been so formed that it defines a physical loop the molten metal in which correspondingly forms an electrical loop constituting the secondary winding of an induction heating transformer.

According to the present invention the need for a specially designed launder is eliminated, while retaining the advantages of associating induction heating apparatus with the launder, by forming spaced apart ports in the bottom of the launder and providing beneath it a structure defining a generally U-shaped duct the two ends of which open into the launder by way of said ports respectively, together with an induction heating primary coil disposed between the two limbs of said duct so as to be in magnetically coupled relationship with molten metal occupying the duct. In use metal flowing along the launder will fill the U-shaped duct so that the molten metal then occupying the duct, together with the molten metal occupying the launder between the two ports therein, forms a closed electrical loop constituting a short circuited secondary winding surrounding the primary coil. To increase the magnetic coupling and thereby the induction heating efficiency, a magnetic core is preferably provided which extends through the primary coil and preferably also embraces at least one of the limbs of the U-shaped duct. The molten metal may be allowed to flow freely along the launder, except to the extent that it enters and occupies the duct. Alternatively, with the ports disposed the one downstream of the other, an electrically conductive barrier may be inserted into the launder between the ports so that the molten metal is constrained to flow via the duct, the section of the launder lying between the ports and including the barrier nevertheless remaining occupied by the molten metal to maintain the electrical loop through the electrically conductive barrier. In either case heat will be induced in the molten metal as it traverses the induction heating section of the launder.

In addition to affording an improved solution to the above-mentioned problem of compensating for heat loss in the launder, the launder heating apparatus of the present invention also has application for superheating molten metal in the launder after it leaves a melting furnace in order to raise its temperature above the furnace temperature. Such superheating may for instance be necessary in order to compensate for variations in the temperature of the metal as it leaves the furnace, or for heating the metal to a temperature beyond the capabilities of the furnace, or beyond its economic operation, as may be required for example in order to perform certain types of casting operation or to carry out certain processes.

A side effect of the induction heating action is that the heating currents induced in the molten metal set up an electromagnetic stirring action in it. This is desirable because it assists the maintenance of temperature uniformity in the metal and tends to prevent the segregation of alloys therein; it also permits efficient and effective introduction of metallurgical additions to the metal.

Figure 2:
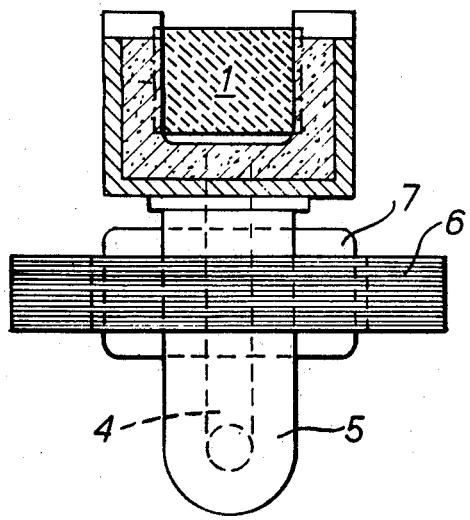

In order that the invention may be more fully understood reference will now be made by way of example to the accompanying drawing in which, diagrammatically, FIG. 1 is a sectional elevation of a launder heating apparatus conforming to the invention, only a portion of the length of the launder being shown, and FIG. 2 is a side view from the right-hand side of the launder heating apparatus shown in FIG. 1.

Referring to the drawing, a launder 1 of open-trough form for conveying molten metal from a furnace in the direction indicated by the arrows, is formed with two ports 2 and 3 spaced apart in the flow direction in the bottom of the launder. These ports are in alignment with the open ends of a U-shaped duct 4 defined by a structure 5 beneath the launder 1. A laminated magnetic core structure 6 embraces one limb 4' of the duct 4 and carries an induction heating coil 7 disposed between the two limbs of the duct 4 as shown in cross-section in FIG. 1. The launder 1 and duct 4 are lined with refractory material 8 within outer metal casings 9 and it is ensured, for instance as indicated at 10, that these casings do not together form a complete electrical path embracing the coil 7. On the other hand, molten metal occupying the duct 4 and the section of the launder between the ports 2 and 3 will form such an electrical path embracing the coil 7 and thereby constituting a short-circuited secondary coil turn with respect thereto. Energization of the coil 7 will thereby create an induction heating effect in the molten metal in accordance with well known principles. At the same time electromagnetic forces will be set up which will create a certain amount of circulation of the molten metal.

As previously mentioned, molten metal may be allowed to flow unimpeded along the launder 1. Alternatively the launder may be dammed by a barrier 11 placed in it between the ports 2 and 3 so that the molten metal is constrained to flow round the duct 4. The section of the launder between the ports 2 and 3 will still be occupied by molten metal and the barrier 11 is made of some suitable electrically conductive material, e.g. graphite, so as to maintain the continuity of the electrical circuit through the molten metal.

It will be appreciated that the section of launder carrying the induction heated loop will be mounted on trunnions to enable the necessary tilting so as to empty the loop.

What I claim is:

1. An apparatus for heating molten metal characterized by a channel having an inlet and an outlet for the molten metal, also having two ports therebetween, one of the ports being situated nearer the said inlet and the other situated nearer the said outlet, a U-shaped duct interconnecting said ports and, with the channel portion between the said ports, defining a free aperture, a magnetic core extending through said aperture and encircling at least one limb of said duct, a primary coil supplied with energy disposed within said aperture and carried by said core, and a dam between said ports made of electrically conducting material, said dam considerably reducing the flow of molten metal through said channel between the said ports and adapted to maintain the continuity of an electrical circuit through molten metal occupying said duct and channel portion between said ports.

2. An apparatus according to claim 1 characterized in that the core is laminated.

3. An apparatus according to claim 1 characterized in that the said channel and duct have linings made of electrically insulating refractory material, which are held by outer casing walls made of metal, said linings extending between the ends of the metal walls which encase the said channel and duct respectively, whereby to prevent induced loop current flow through the said walls.

4. An apparatus according to claim 1, characterized in that the dam is joined to the bottom of the channel.

References Cited

UNITED STATES PATENTS

| 3,192,303 | 6/1965 | Olsson | 13—29 X |
| 1,361,754 | 12/1920 | Dhe | 266—38 |
| 2,674,640 | 4/1954 | Tama | 13—29 X |

FOREIGN PATENTS

| 1,191,933 | 4/1965 | Germany. |
| 957,599 | 2/1957 | Germany. |

J. SPENCER OVERHOLSER, Primary Examiner

R. D. BALDWIN, Assistant Examiner